United States Patent
Moriwaki et al.

(10) Patent No.: US 6,460,129 B1
(45) Date of Patent: Oct. 1, 2002

(54) PIPELINE OPERATION METHOD AND PIPELINE OPERATION DEVICE TO INTERLOCK THE TRANSLATION OF INSTRUCTIONS BASED ON THE OPERATION OF A NON-PIPELINE OPERATION UNIT

(75) Inventors: Shinichi Moriwaki; Masahiro Yanagida; Shuntaro Fujioka; Hidenobu Ohta, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/955,238

(22) Filed: Oct. 21, 1997

Related U.S. Application Data

(63) Continuation of application No. 08/460,280, filed on Jun. 2, 1995, now abandoned.

(30) Foreign Application Priority Data

Sep. 19, 1994 (JP) .............................................. 6-223677

(51) Int. Cl.[7] .............................................. G06F 15/76
(52) U.S. Cl. .......................... 712/31; 712/42; 712/200; 712/201; 712/248
(58) Field of Search ........................... 712/31, 42, 200, 712/201, 248

(56) References Cited

U.S. PATENT DOCUMENTS

| 3,651,482 A | * | 3/1972 | Benson et al. ............... 395/775 |
| 4,757,445 A | * | 7/1988 | Zolnowsky et al. ......... 395/383 |
| 4,811,205 A | * | 3/1989 | Normington et al. ....... 395/163 |
| 4,819,229 A | * | 4/1989 | Pritty et al. .................... 370/89 |
| 4,855,947 A | * | 8/1989 | Zmyslowski et al. ........ 395/375 |
| 4,888,689 A | * | 12/1989 | Taylor et al. ................ 395/467 |
| 5,134,693 A | * | 7/1992 | Saini ............................ 395/375 |
| 5,150,469 A | * | 9/1992 | Jouppi .......................... 395/375 |
| 5,193,158 A | * | 3/1993 | Kinney et al. ................ 395/375 |
| 5,363,490 A | * | 11/1994 | Alferness et al. ............ 395/581 |
| 5,420,997 A | * | 5/1995 | Browning et al. ........... 395/425 |
| 5,506,968 A | * | 4/1996 | Dukes .......................... 395/728 |
| 5,519,841 A | * | 5/1996 | Sager et al. .................. 395/412 |
| 5,530,804 A | * | 6/1996 | Edgington et al. ...... 395/183.06 |
| 5,555,384 A | * | 9/1996 | Roberts et al. .............. 395/375 |
| 5,559,977 A | * | 9/1996 | Avnon et al. ................ 395/375 |
| 5,581,719 A | * | 12/1996 | Steely, Jr. et al. ........... 395/383 |
| 5,619,408 A | * | 4/1997 | Black et al. ................. 395/567 |

FOREIGN PATENT DOCUMENTS

JP 4-181468 6/1992

* cited by examiner

*Primary Examiner*—Thomas Lee
*Assistant Examiner*—Jinsong Hu
(74) *Attorney, Agent, or Firm*—Staas & Halsey LLP

(57) ABSTRACT

A pipeline operation method and a pipeline operation device in which an operation result of an operation unit can be effectively written to a register. In the pipeline operation method and the pipeline operation device, a pipeline operation unit that can perform a pipeline operation, a non-pipeline operation unit that cannot perform a pipeline operation, and a register that is shared by the pipeline operation unit and the non-pipeline operation unit are arranged. To perform an operation while an operation result of each of the pipeline units is being written into the register, translating an instruction to the pipeline operation unit is interlocked when the writing of the operation result of the pipeline operation unit overlaps with the writing of the operation result of the non-pipeline operation unit. The pipeline operation method and the pipeline operation device are applicable to a computing system where plural operation units including pipeline operation units and non-pipeline operation units share one writing port to perform an arithmetic operation.

6 Claims, 11 Drawing Sheets

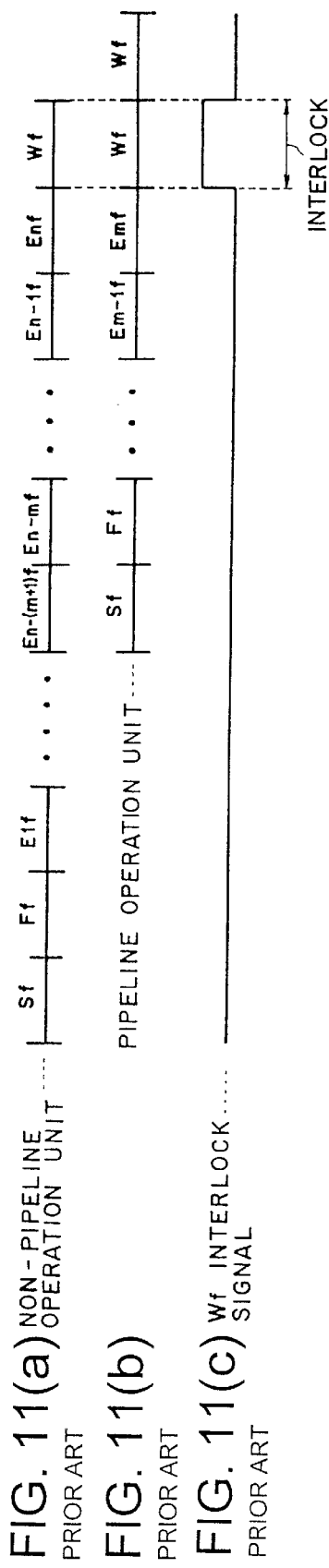
FIG. 11(a) PRIOR ART NON-PIPELINE OPERATION UNIT
FIG. 11(b) PRIOR ART PIPELINE OPERATION UNIT
FIG. 11(c) PRIOR ART Wf INTERLOCK SIGNAL

PIPELINE OPERATION METHOD AND PIPELINE OPERATION DEVICE TO INTERLOCK THE TRANSLATION OF INSTRUCTIONS BASED ON THE OPERATION OF A NON-PIPELINE OPERATION UNIT This application is a continuation, of application Ser. No. 08/460,280, filed Jun. 2, 1995, now abandoned.

BACKGROUND OF THE INVENTION

1) Field of the Invention

The present invention relates to a pipeline operation method in which plural operational units including pipeline operational units (e.g. multipliers) and non-pipeline operational units (e.g. dividers) share a single writing port to perform an operational process. The present invention also relates to a pipeline operation device in which plural operational units including pipeline operational units (e.g. multipliers) and non-pipeline operational units (e.g. dividers) share a single writing port to perform an operational process.

2) Description of the Related Art

Generally, in order to write operation results from plural operation units into a floating-point register (hereinafter referred to as FR), there are (1) a writing method in which a FR includes writing ports corresponding to the number of operation units and the operation result from each operation unit is ready to write to the FR without controlling the writing timing, and (2) a writing method in which plural operation units share one writing port and the operation result of each operation unit is written to the FR while the writing timing is being controlled.

Today's computers perform the pipeline operation shown in FIG. 6 for a command execution. Referring to FIG. 6, numeral 2 represents an instruction queue, 3 represents an instruction register, 4 represents a decoder (DEC), 5 represents a pipelinne control circuit, 6 represents a floating-point register (FR), and 9 represents a pipeline operation unit. The elements will be explained in detail with reference to FIG. 8.

In the pipeline operation, the following instruction is started before the previous instruction has been completed. A process which can be divided into plural steps is distributed to plural processing mechanisms corresponding to each step land subjected to a process. But datum to be processed does not pass the same processing unit plural times.

The pipeline operation, as shown in FIG. 6, is formed of an instruction selection stage Sf, a register reading stage Ff, operation execution stages E1f to Emf, and a writing stage Wf. The instruction selection stage Sf is a stage which selects an instruction. The register reading stage Ff is a stage which translates or decodes an instruction and reads data out of a register. The operation execution stages E1f to Emf are stages which execute an arithmetic operation (the case where an arithmetic operation is performed in the m-th stage, where m is the number of operation cycles (the number of operation execution stages) of the pipeline operation unit 9 in FIG. 6). The writing stage Wf is a stage which writes an operation result into a register.

In the pipeline operation, the pipeline control circuit 5 selects an instruction to be processed out of the instruction queue 2 in the first instruction selection stage Sf to write it into the instruction register 3. The decoder 4 decodes an instruction selected in the instruction selection stage Sf in the register reading stage Ff and then reads data out of the FR 6 according to the decoded result.

Thereafter, an actual operation is executed using data read out of the operation unit 9 in the operation execution stages E1f to Emf. Then the final operation result obtained in the operation execution stage Emf is written into the FR 6 in the writing stage Wf.

In the above-mentioned operation, plural stages are carried out in parallel (overlap execution) while they are shifted by one cycle (one stage). Thus in every cycle, data is input and the operation result is output. The pipeline operation unit 9 can operate the above-mentioned operation.

In addition to the pipeline operation unit 9 such as a multiplier that can perform the pipeline operation, there is a non-pipeline operation unit such as a divider which cannot operate the pipeline operation or cannot operate plural stages in parallel (overlap execution).

When the non-pipeline operation unit, as shown in FIG. 7, begins an arithmetic operation, it cannot execute the register reading stage Ff until the completion of the arithmetic operation or for $(n+1)\tau$, where n is the number of operation cycles (the number of operation execution stages) of the non-pipeline operation unit and $\tau$ is time (control period) taken for one cycle (one stage), so that the next data cannot be received. In FIG. 7, numeral 7 represents a non-pipeline operation unit.

Hence, non-pipeline operation unit cannot perform a pipeline operation as the pipeline operation unit 9.

Generally, the divider being a non-pipeline operation unit takes, much time for an arithmetic operation and has a small appearance frequency as an instruction.

As shown in FIGS. 8 and 10, generally, the non-pipeline operation unit 7 such as a divider and the pipeline operation unit 9 which can perform a pipeline operation often share the writing port 6a of the FR 6.

However, where the writing port 6a is shared, two operation units 7 and 9 cannot simultaneously execute an writing operation to the FR 6. Therefore, two methods have been conventionally used as follows:

(a) The pipeline operation unit 9 is inhibited in its operation while the non-pipeline operation unit 7 is operating.

(b) The writing stage Wf of the pipeline operation unit 9 is delayed by 1τ only when the writing stage Wf of the non-pipeline operation unit 7 is overlapped with the writing stage Wf of the pipeline operation unit 9.

The configuration of the pipeline operation device adopting the former case (a) is shown in FIG. 8. In FIG. 8, numeral 1 represents an operation pipeline control unit. The operation pipeline control unit 1 receives an arithmetic instruction from a control unit (not shown) and then subjects the entire operation unit including the operation units 7 and 9, and the FR 6 to a pipeline control. The operation pipeline control unit 1 includes an instruction queue 2, an instruction register 3, a decoder (DEC) 4, and a pipeline control circuit 5.

The instruction queue 2 holds an arithmetic instruction sent from a control unit (not shown). The instruction register 3 is selected by the pipeline control circuit 5 and then stores temporarily an arithmetic instruction read out of the instruction queue 2.

The decoder 4 decodes an arithmetic instruction stored in the instruction register 3 and then sends the decoded results as a register number to the FR 6, an instruction signal to operation units 7 and 9, and an arithmetic start signal to the pipeline operation unit 9.

The pipeline control circuit 5 issues an instruction selection signal to the instruction queue 2; issues an interlock signal in the register reading stage Ff to the decoder 4; and then controls the pipeline of the operation unit during the operation of the non-pipeline operation unit 7.

The FR 6 reads and stores data corresponding to the address designated by the operation pipeline control unit 1 and stores the operation result of the operation units 7 and 9.

The non-pipeline operation unit 7 such as a divider starts its arithmetic operation in response to an operation start signal from the operation pipeline control unit 1 (decoder 14). The pipeline operation unit 9 such as a multiplier can execute the above-mentioned pipeline operation and starts arithmetic operation when an operation start signal is received from the operation pipeline control unit 1 (decoder 4).

As shown in FIGS. 9(a)–9(c) after the non-pipeline operation unit 7 starts its operation (FIG. 9(a)), the pipeline operation unit 9 sharing the writing port 6a may start its arithmetic operation (FIG. 9(b)). In this case, after the completion of the instruction selection stage Sf, when the pipeline control circuit 5 outputs an interlock signal to the decoder 4, the pipeline operation unit 9 does not start its arithmetic operation because it is interlocked in the register reading stage Ff.

After the completion of the arithmetic operation of the non-pipeline operation unit 7, the operation result is written into the FR 6 in the writing stage Wf. Then the interlock state in the register reading stage Ff is released because the output of the interlock signal is stopped and then the pipeline operation unit 9 starts its arithmetic operation. Hence, the pipeline operation unit 9 waits for (n+1) $\tau$, where n is the number of operation cycles (the number of operation execution stages) of the non-pipeline operation unit 7 (FIG. 9(c)).

Next, the configuration of the pipeline operation device adopting the latter method (b) will be shown in FIG. 10. The pipeline operation device shown FIG. 10 is substantially identical to that shown in FIG. 8. However, the pipeline control circuit 5 in the pipeline operation device shown in FIG. 10 includes an interlock signal producing circuit 5A.

When the writing stage Wf of the non-pipeline operation unit 7 overlaps with the writing stage Wf of the pipeline operation unit 9, the interlock signal producing circuit 5A issues an interlock signal to the pipeline operation unit 9 in the writing stage Wf.

As shown in FIGS. 11(a)–11(c), while the non-pipeline operation unit 7 is operating (FIG. 11(a), the pipeline operation unit 9 sharing the writing port 6a executes an arithmetic operation (FIG. 11(b). In this case, when the writing stage Wf of the pipeline operation unit 9 overlaps with the writing stage Wf of the non-pipeline operation unit 7, the interlock signal producing circuit 5A issues an interlock signal to the pipeline operation unit 9 in the writing stage Wf of the non-pipeline operation unit 9 (FIG. 11(c).

When receiving an interlock signal, the pipeline operation unit 9 is interlocked, thus ceasing its operation in the writing stage Wf. After waiting for 1$\tau$ during which the non-pipeline operation unit 7 writes the operation result into the FR 6, the non-pipeline operation unit 7 releases the interlock state. Then the non-pipeline operation unit 7 writes the operation result of the pipeline operation unit 9 to the FR 6 in the writing stage Wf.

However, there has been a disadvantage in that since the conventional pipeline operation device adopting the former method (a) cannot use the pipeline operation unit 9 for the maximum term (n+1)$\tau$ during which the non-pipeline operation unit 7 completes a writing operation to the FR 6 in the writing stage Wf, the operation processing performance is remarkably reduced.

The conventional pipeline operation unit adopting the latter method (b) can resolve the above-mentioned problems. However, the mechanism which stops simultaneously pipelines in the pipeline operation unit 9 is needed to stop the pipeline operation unit 9 in the writing stage Wf. There has been a disadvantage in that adding the stop mechanism leads to complicated circuits and an increased number of components.

SUMMARY OF THE INVENTION

The present invention is made to overcome the above mentioned problems. An object of the present invention is to provide a pipeline operation method that can effectively write the operation results of plural operation units sharing a writing port merely by adding a simplified circuit, thus improving the performance of an operation process.

Another object of the present invention is to provide a pipeline operation device that can effectively write the operation results of plural operation units sharing a writing port merely by adding a simplified circuit, thus improving the performance of an operation process.

In order to achieve the above objects, according to the present invention, the pipeline operation method suitable to a system including a pipeline operation unit that can perform a pipeline operation, a non-pipeline operation unit that cannot perform a pipeline operation, and a register that is shared by the pipeline operation unit and the non-pipeline operation unit, performs an arithmetic operation while an operation result of each of the pipeline units is being written into the register, and includes the step of interlocking translating an instruction to the pipeline operation unit when a writing stage of an operation result from the pipeline operation unit is overlapped with a writing stage of an operation result from the non-pipeline operation unit.

According to the present invention, the pipeline operation device is characterized by a pipeline operation unit that can perform a pipeline operation; a non-pipeline operation unit that cannot perform a pipeline operation; a register that is shared by the pipeline operation unit and the non-pipeline operation unit; an operation pipeline control unit that controls the operation of each of the pipeline operation unit and the non-pipeline operation unit; the pipeline control unit controlling an operation of each of the operation units and performing an arithmetic operation while an operation result of each of the operation units is being written into the register; the operation pipeline control unit including an interlock execution unit that interlocks translating an instruction to the pipeline operation unit when a writing stage of an operation result of the pipeline operation unit overlaps with a writing stage of an operation result of the non-pipeline operation unit.

As described above, according to the pipeline operation method and the pipeline operation device, when the writing stage of the operation result of the pipeline operation unit overlaps with the writing stage of the operation result of the non-pipeline operation unit, the stage in which an instruction to the pipeline operation unit is translated is interlocked, whereby the operation process of the pipeline operation unit is temporarily postponed.

Therefore, each operation result is written to the register with the execution timing shifted between the writing stage of the operation result of the pipeline operation unit and the writing stage of the operation result of the non-pipeline operation unit. The operation results of plural operation units sharing a writing port can be effectively written into a register merely by adding a simplified circuit so that the arithmetic operation performance can be largely improved.

BRIEF DESCRIPTION OF THE DRAWINGS

FIGS. 11(a)–11(c) are time charts showing the operation of the pipeline operation device shown in FIG. 10.

DESCRIPTION OF THE PREFERRED EMBODIMENTS (a) Aspect of Invention

Figure 1:
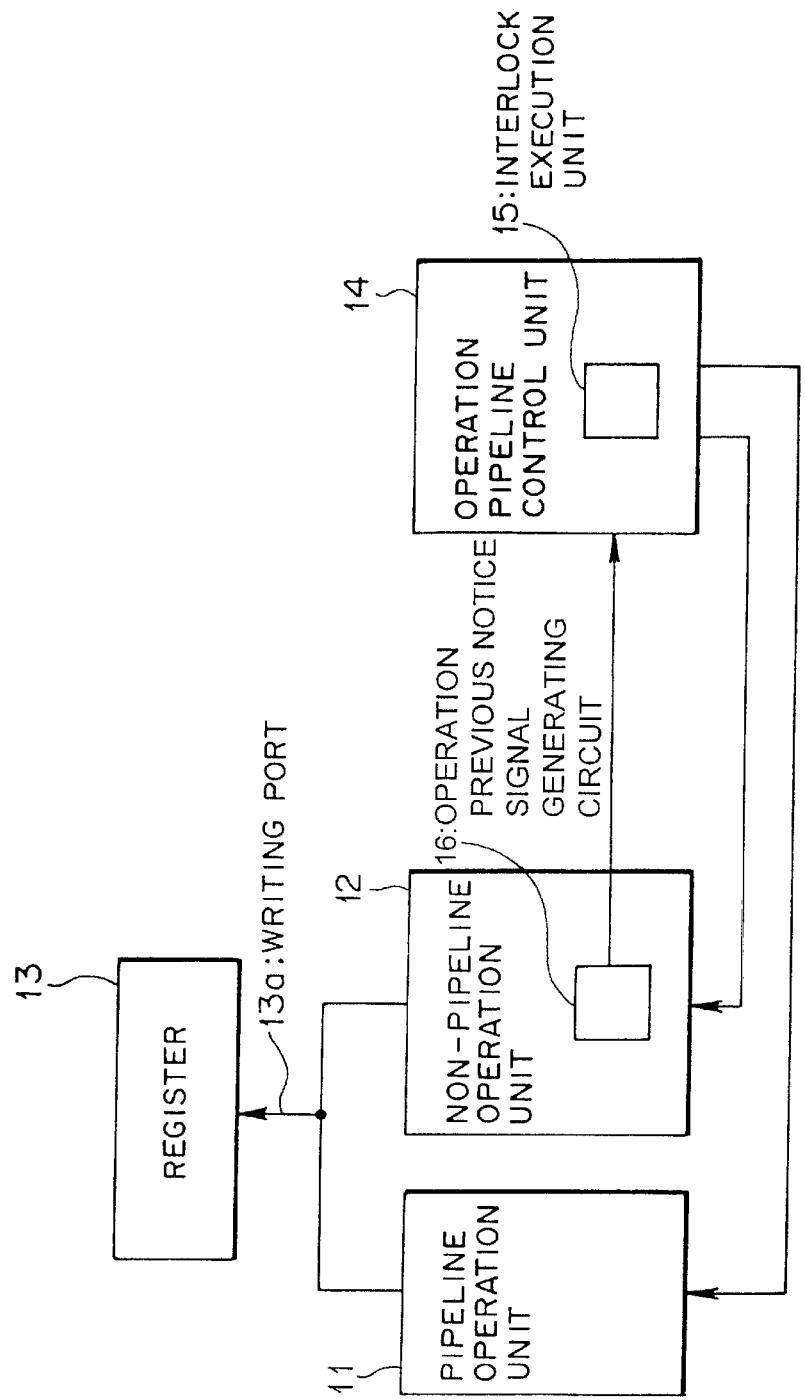
FIG. 1 is a block diagram showing an aspect of the present invention.

FIG. 1 is a block diagram showing an aspect of the present invention. Referring to FIG. 1, numeral 11 represents a pipeline operation unit that can perform a pipeline operation, 12 represents a non-pipeline operation unit that cannot perform a pipeline operation, 13 represents a register which has a writing port 13a which is shared with the pipeline operation unit 11 and the non-pipeline operation unit 12 to write the operation results of the operation units 11 and 12, and 14 represents an operation pipeline control unit that controls the arithmetic operation in the pipeline operation unit 11 and the non-pipeline operation unit 12.

The operation pipeline control unit 14 includes an interlock execution unit 15. The interlock execution unit 15 interlocks translating an instruction to the pipeline operation unit 11 when the stage of writing the operation result of the pipeline operation unit 11 overlaps with the stage of writing the operation result of the non-pipeline operation unit 12.

The non-pipeline operation unit 12 includes an operation end previous notice signal generating circuit 16 that produces an operation end previous notice signal that notices and reports the end of an arithmetic operation of the non-pipeline operation unlit 12 to the operation pipeline control unit 14, thus providing previous notice of the end of the arithmetic operation. The interlock execution unit 15 interlocks the stage in which an instruction to the pipeline operation unit 11 is translated by one stage, according to the operation end notice signal from the operation end notice signal generating circuit 16.

The operation end previous notice signal generating circuit 16 produces an operation end previous notice signal when the non-pipeline operation unit 12 performs the (n−m)-th operation stage (where m is the number of operation stages of the pipeline operation unit 11, and n (>m) is the number of operation stages of the non-pipeline operation-unit 12).

In the pipeline operation method and the pipeline operation device according to the present invention shown in FIG. 1, the operation pipeline control unit 14 controls then arithmetic operation of the operation units 11 and 12, and then performs the arithmetic operation while the operation results of the operation units 11 and 12 are being written into the register 13.

Where the writing stage of the operation result of the pipeline operation unit 11 overlaps with the writing stages of the operation result of the non-pipeline operation unit 12, the interlock execution unit 15 interlocks the stage of translating the instruction of the pipeline operation unit 11.

Thus the arithmetic operation of the pipeline operation unit 11 is temporarily delayed without translating the instruction to the pipeline operation unit 11. Hence, with the execution timing shifted between the writing stage of the operation result of the pipeline operation unit 11 and the writing stage of the operation result of the non-pipeline operation unit 12, each operation result can be written into the register 13, without stopping the operation of the pipeline operation unit 11 in the writing stage, in the conventional manner.

Before the non-pipeline operation unit 12 completes its arithmetic operation, the operation end previous notice signal generating circuit 16 produces an operation end previous notice signal to report the operation pipeline control unit 14 of the fact. The interlock execution unit 15 in the operation pipeline control unit 14 interlocks the stage of translating an instruction to the pipeline operation unit 11 by one stage, according to the operation end notice signal.

The arithmetic operation of the pipeline operation unit 11 after the instruction translation is delayed by one stage. As a result, the execution timing in the writing stage of the operation result of the pipeline operation unit 11 is shifted from that in the writing stage of the operation result of the non-pipeline operation unit 12 by one stage. Thus each operation result can be written sequentially to the register 13.

In this case, the operation end previous notice signal generating circuit 16 produces an operation end previous notice signal when the non-pipeline operation unit 12 executes the (n−m)-th operation stage, or before the non-pipeline operation unit 12 completes the arithmetic operation in the (m+1) stage. In other words, where the operation execution stage of translating an instruction to the pipeline operation unit 11 is executed, the stage of writing the operation result of the pipeline operation unit 11 overlaps with the stage of writing the operation result of the non-pipeline operation unit 12.

The execution of the stage of translating the instruction to the pipeline operation unit 11 according to the operation end notice signal produced in the above timing can be certainly interlocked by one stage. As described before, the arithmetic operation of the pipeline operation unit 11 after translating an instruction is delayed by one stage. As a result, the operation result from the pipeline operation unit 11 and the operation result of the non-pipeline operation unit 12 are written sequentially into the register 13.

As described above, in the pipeline operation method and the pipeline operation device according to the present invention, each operation result can be written into the register 13 while the execution timing in the writing stage of the operation result of the pipeline operation unit 11 is shifted from that in the writing stage of the operation result of the non-pipeline operation unit 12. Hence, the operation results of plural operation units sharing a writing port can be effectively written into the register merely by adding a simplified circuit, whereby the operation performance can be largely improved.

The non-pipeline operation unit 12 produces an operation end previous notice signal before the end of its arithmetic operation and interlocks the stage of translating an instruction to the pipeline operation unit 11 by one stage, according to the operation end previous notice signal. Thus, after an instruction translation, the arithmetic operation of the pipeline operation unit 11 is delayed by one stage. The execution timing in the writing stage of the operation result of the pipeline operation unit 11 is shifted by one stage from that in the writing stage of the operation result of the non-pipeline operation unit 12. As a result, each operation result can be effectively written to the register, whereby the operation performance can be improved.

In this case, since the operation end previous notice signal is produced in the (n−m)-th operation stage of the non-pipeline operation unit 12, where m is the number of operation execution stages of the pipeline operation unit 11 and n is the number of operation execution stages of the non-pipeline operation unit 12, the execution in the instruction translation stage to the pipeline operation unit 11 can be certainly interlocked by one stage according to the operation end previous notice signal. The effect described above can be obtained.

(b) Embodiment

An embodiment according to the present invention will be described below with reference to the attached drawings.

Figure 2:
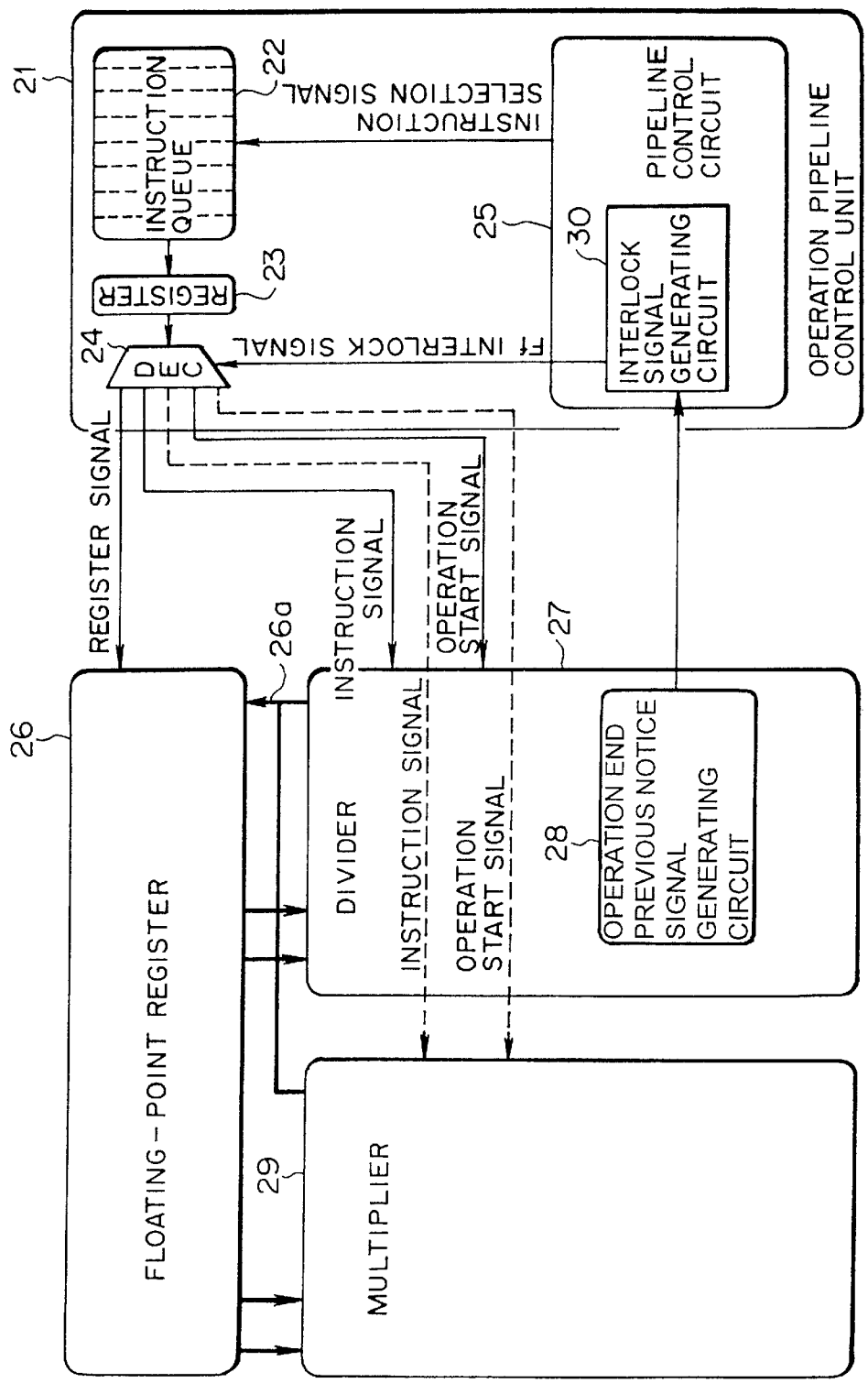
FIG. 2 is a block diagram showing the pipeline operation device according to an embodiment of the present embodiment.

FIG. 2 is a block diagram showing a pipeline operation device being an embodiment of the present invention. Referring to FIG. 2, numeral 21 represents an operation pipeline control unit. The pipeline control unit 21 receives an operation instruction from a control unit (not shown) to control a pipeline operation of the entire operation unit including a divider 27 (to be described later), a multiplier 29, and a floating-point register (FR) 26. The operation control unit 21 includes an instruction queue 22, an instruction register 23, a decoder (DEC) 24, and a pipeline control unit 25.

The instruction queue 22 holds an operation instruction which is transmitted from a control unit (not shown). The instruction register 23 is selected by the pipeline control unit 25 to store temporarily an operation instruction read out of the instruction queue 22.

The decoder 24 translates an operation instruction stored in the instruction register 23, and then transmits the translation result as a register number to the FR 26, the translation result as an instruction signal to the divider 27, and the translation result as an operation start signal to the multiplier 29.

The pipeline control circuit 25 issues an instruction selection signal to the instruction queue 22. The pipeline control circuit 25 which includes an interlock signal generating circuit 30 (to be described later) controls the pipeline of the operation unit.

The FR 26 reads out and stores data corresponding to an address specified by the operation pipeline control unit 21. The FR 26 also has a writing port 26a shared by the divider 27 and the multiplier 29 to store the operation result from the divider 27 or the multiplier 29.

The divider 27, or a non-pipeline operation unit by which a pipeline operation is impossible, starts its arithmetic operation in response to an operation start signal from the operation pipeline control unit (decoder 24) 21. The multiplier 29, or a pipeline operation unit by which a pipeline operation is possible, starts its arithmetic operation in response to an operation start signal from the operation pipeline control unit (decoder 24) 21.

According to the present embodiment, the divider 27 includes an operation end previous notice signal generating circuit 28. The operation end previous notice signal generating circuit 28 produces an operation end previous notice signal which notices and reports the end of the operation of the divider 27 when the divider 27 operates the (n−m)-th operation stage or at (m+1) τ before the divider 27 will complete its arithmetic operation, where n is the number of operation stages (the number of operation cycles) of the divider 27, m (<n) is the number of operation stages (the number of operation cycles) of the multiplier 29, and τ is a time (control period) needed in one cycle (one stage), and then outputs the operation end previous notice signal to the operation pipeline control unit 21.

An interlock signal producing circuit (interlock execution unit) 30 that operates in response to an operation end previous notice signal from the operation end previous notice signal generating circuit 28 is arranged in the pipeline control unit 25 in the operation pipeline control unit 21.

Where the writing stage Wf of the operation result of the divider 27 overlaps with the writing stage Wf of the operation result of the multiplier 29, the interlock signal generating circuit 30 interlocks the stage Ff of translating an instruction to the multiplier 29.

In a detail explanation, when receiving an operation end previous notice signal from the operation end notice signal generating circuit 28 in the divider 27, the interlock signal generating circuit 30 executes the register reading stage (a stage including an instruction translation process to the multiplier 29) Ff. Then the interlock signal generating circuit 30 decides that the stage of writing the operation result of the divider 27 overlaps with the stage of writing the operation result of the multiplier 29, and then issues an interlock signal to the decoder 24 in the register reading stage Ff, thus interlocking the execution in the register reading stage Ff by one stage (1τ).

The operation of the pipeline control circuit 25 in the pipeline operation device according to the present embodiment will be described below with reference to FIG. 3(a). The operation of the operation end previous notice signal generating circuit 28 in the pipeline operation device according to the present embodiment will be described below with reference to FIGS. 3(a) and 3(b).

First, the basic operation of the pipeline control circuit 25 according to the present embodiment will be described with reference to the flow chart (steps S1 to S4) shown in FIG. 31(a). The pipeline control circuit 25 selects an instruction stored in the instruction queue 22 every predetermined cycle 1τ and then produces an instruction selection signal to the instruction register 23 (in the stage S1 and the instruction selection stage Sf).

In the next cycle to the instruction selection operation in the step S1, it is decided whether the interlock signal generating circuit 30 has received an operation end previous notice signal from the divider 27 (step S2). If not received, the flow goes back to the step S1. Then an instruction selection operation is performed in the same manner as that described above.

If it is decided that an operation end notice signal from the divider 27 has been received in the step S2, the interlock generating circuit 30 produces an interlock signal Ff to the decoder 24 to interlock the register reading stage Ff only for 1τ (step S3). Then since the decoder 24 stops translating an instruction to the pipeline operation unit 29, it does not issue a command valid (an instruction signal, and an operation start signal) to the pipeline operation unit 29. Thus the pipeline operation unit 29 interlocks the register reading stage Ff for 1τ.

In the stage next to the stage in which the register reading stage Ff is interlocked, the interlock of the register reading stage Ff is released by stopping the Ff interlock signal output from the interlock generating circuit 30 to the decoder 24. Thus the instruction translating operation of the decoder 24 is allowed (step S4).

Thereafter, the process of the pipeline control circuit 25 goes to the step S1. The pipeline of the pipeline operation unit 29 in which the register reading stage Ff is interlocked by one stage executes the following normal operations (in the operation stages E1f to Emf and the writing stage Wf).

The basic operation of the operation end notice signal producing circuit 28 according to the present embodiment will be described with reference to the flow chart shown in FIG. 3(b) (steps S11 and S12). The operation end previous notice signal generating circuit 28 monitors the operation of the divider 27 every predetermined cycle 1τ and decides whether the divider 27 has been in the (n−m)-th operation stage E(n−m)f (step S11).

Where the register reading stage Ff of the multiplier 29 and the operation stage E(n−m)f of the divider 27 are performed at the same time, the writing stage Wf of the operation result of the divider 27 overlaps with the writing stage Wf of the operation result of the multiplier 29. Hence both the writing operations cannot be performed because of the sharing of the writing port 26a of the FR 26.

As described above, according to the present embodiment, the operation end previous notice signal generating circuit 28 decides whether the divider 27 has been in the (n−m)-th operational stage E(n−m)f, or just before the (m+1)-th stage at which the divider 27 completes its operation stage. If the operation stage is the corresponding stage (YES decision in the step S11), the operation end previous notice signal generating circuit 28 issues an operation end previous notice signal which notices and reports that the divider 27 will complete its arithmetic operation after the (m+1)-th stage, to the operation pipeline control unit 21 (pipeline control circuit 25) (step S12).

Figure 3A:
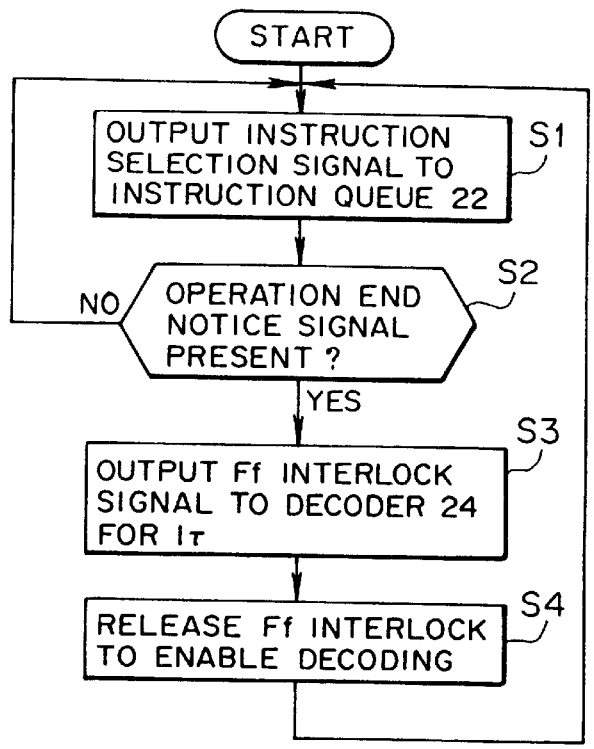
FIG. 3(a) is a flow chart used for explaining the operation of the pipeline control circuit according to the present embodiment.

In response to the operation end previous notice signal, the pipeline control unit 25 performs the steps S2 to S4 shown in FIG. 3(a) and then interlocks the register reading stage Ff to the multiplier 29 for only 1τ. Hence the operation of the multiplier 29 after the register reading stage Ff is delayed by one stage.

Figure 4:
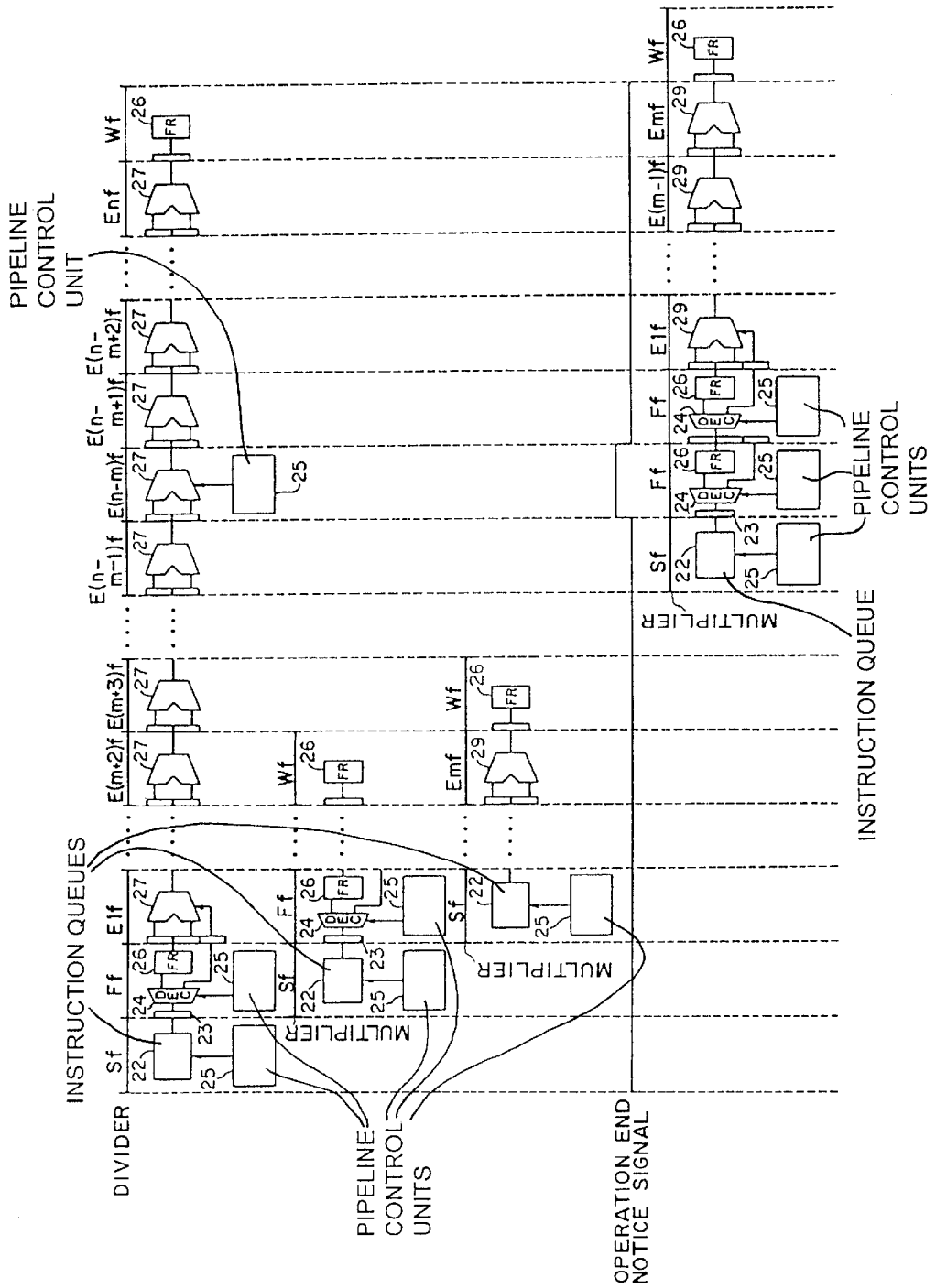
FIG. 4 is a time chart used for explaining the operation of the present embodiment.
Figure 5:
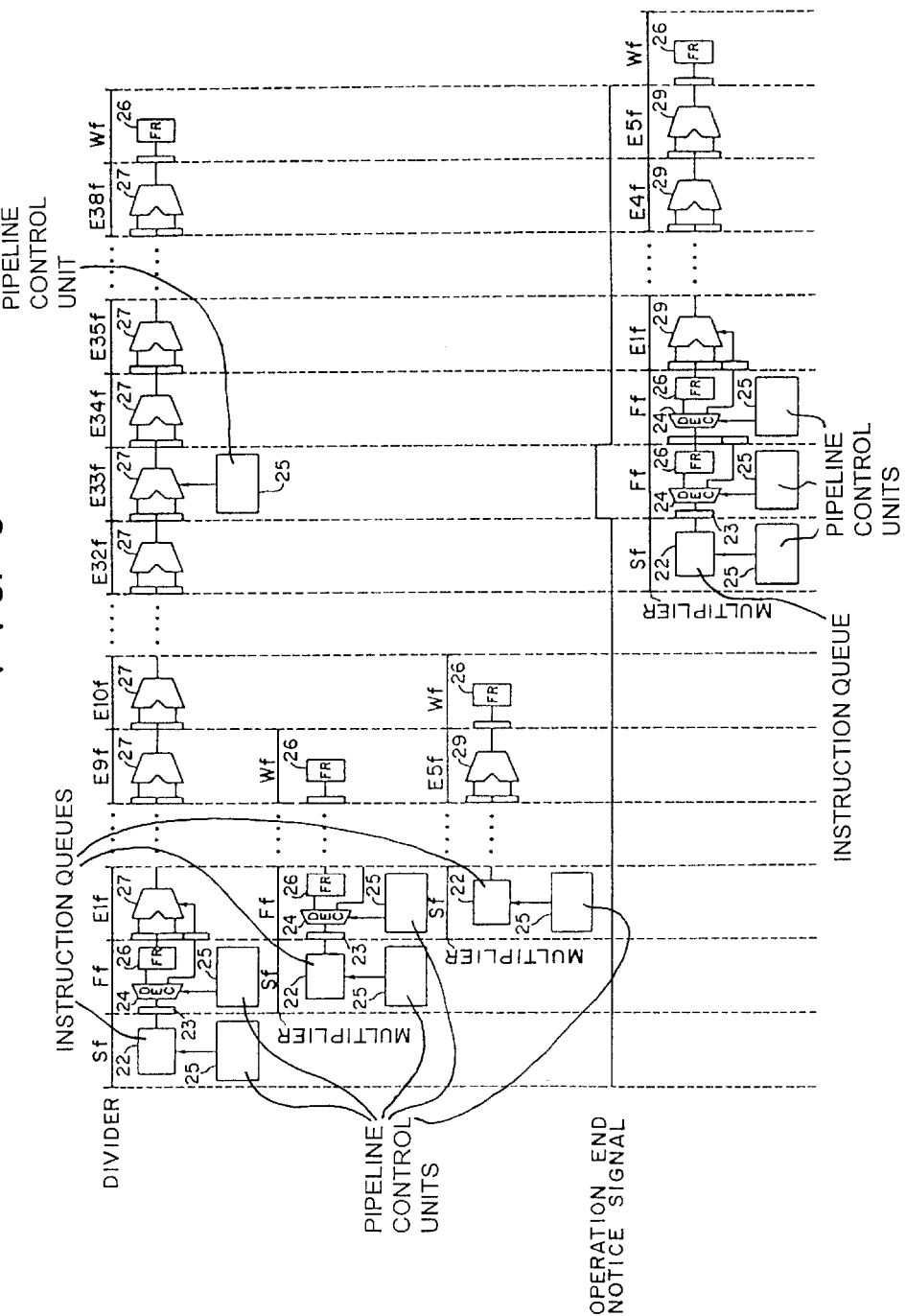
FIG. 5 is a time chart used for explaining the operation of the present embodiment.
Figure 6:
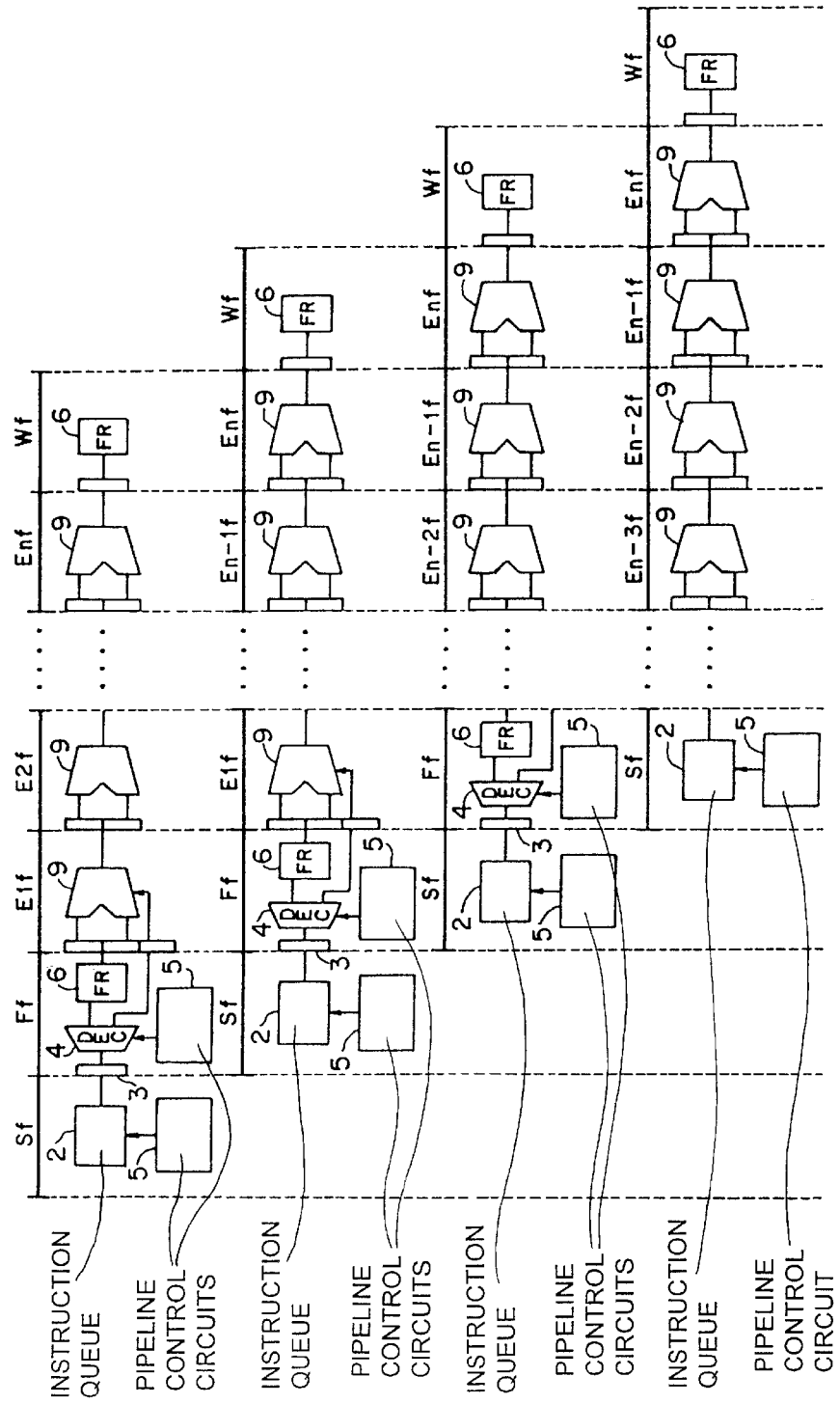
FIG. 6 is a time chart used for explaining a general pipeline operation.
Figure 7:
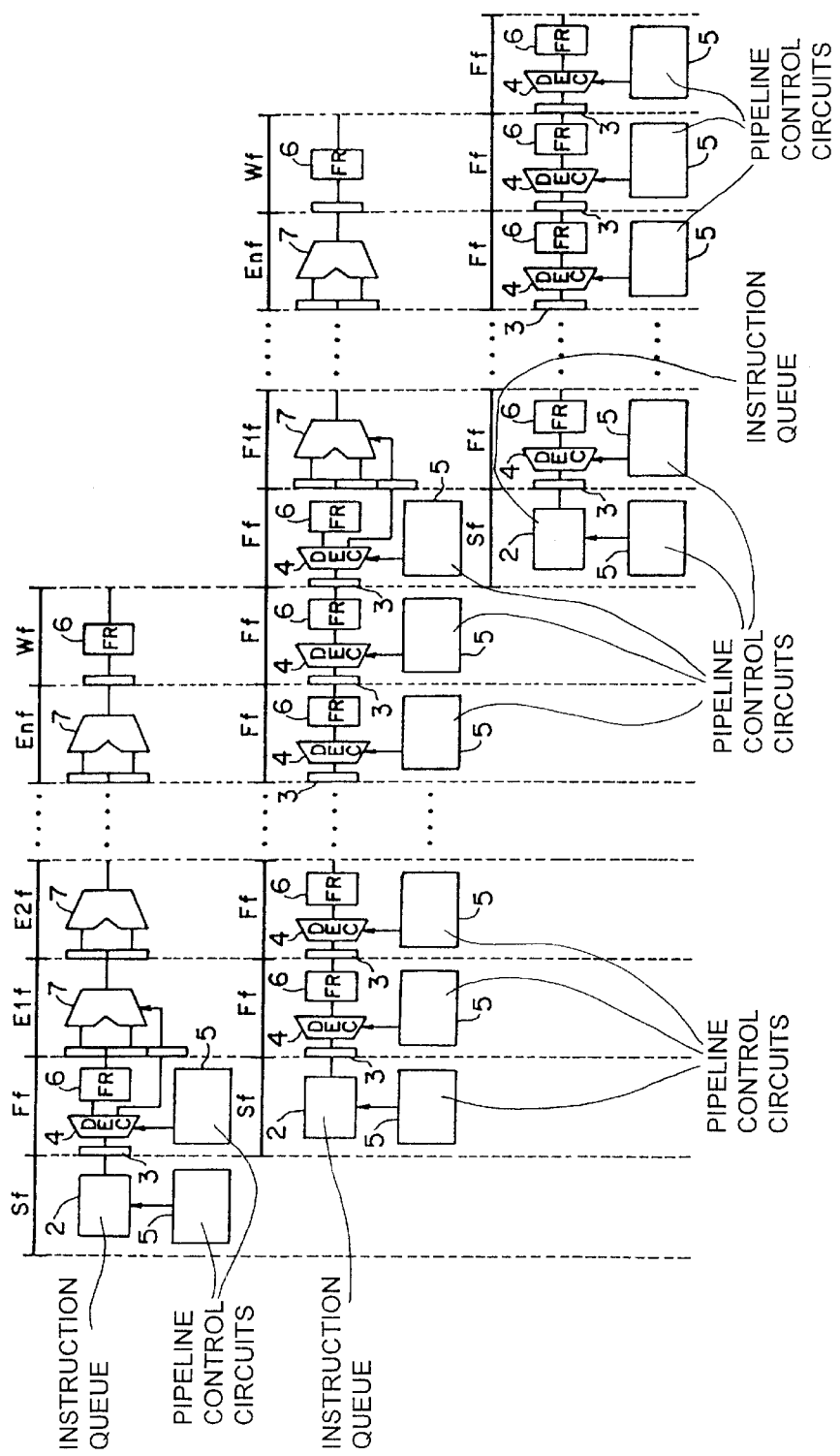
FIG. 7 is a time chart showing a general non-pipeline operation.
Figure 8:
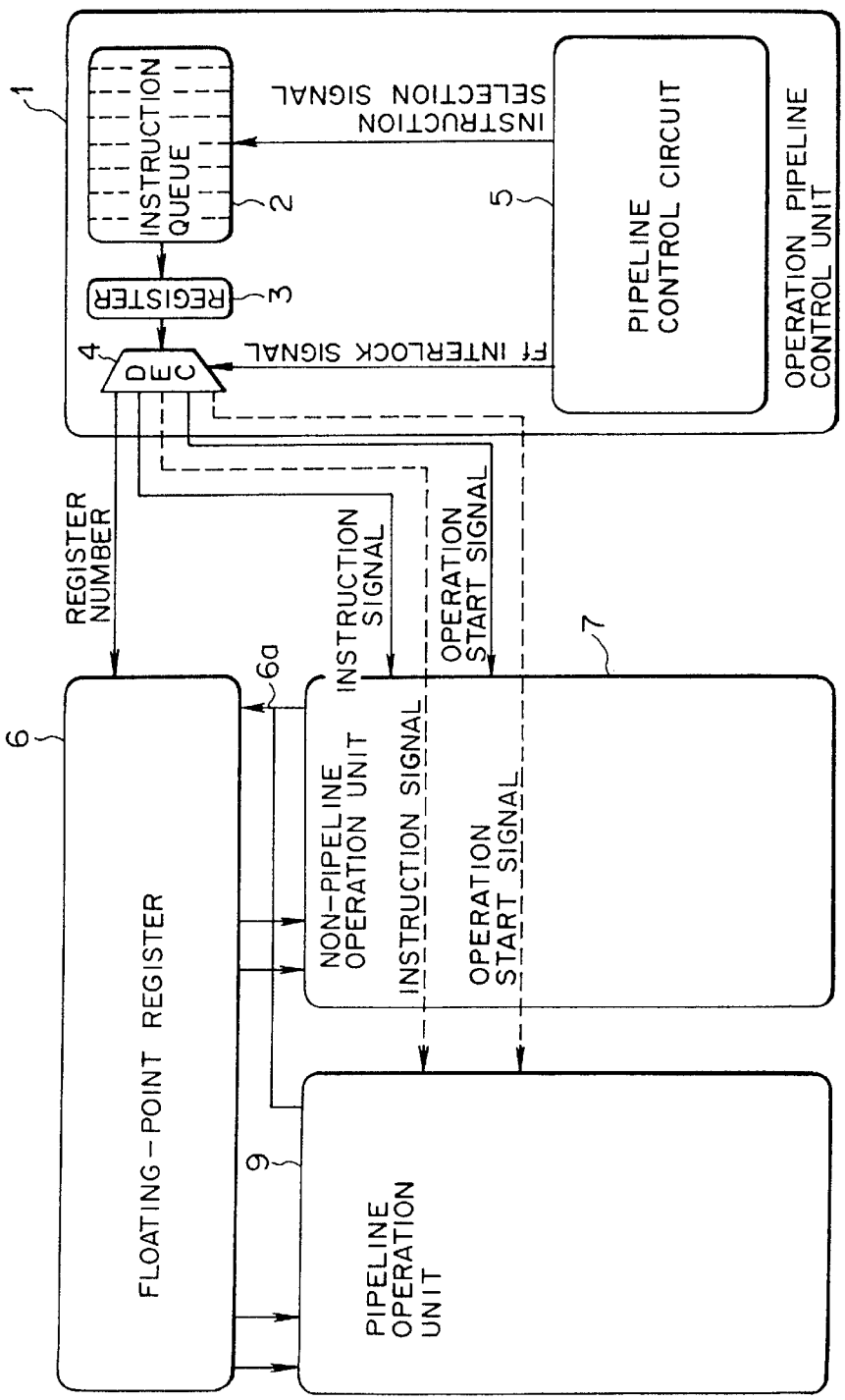
FIG. 8 is a block diagram illustrating a pipeline operation device including a pipeline operation unit and a non-pipeline operation unit sharing one writing port.
Figure 9:
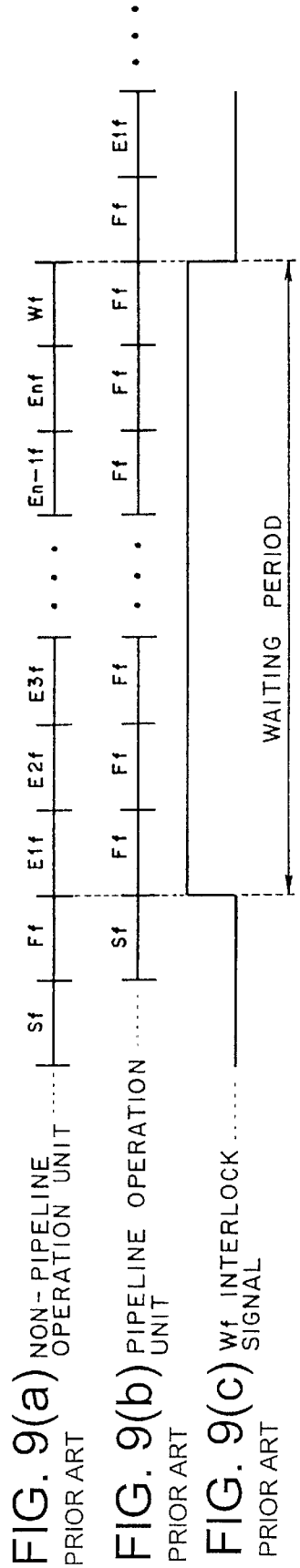
FIGS. 9(a)–9(c) are time charts showing the operation of the pipeline operation device shown in FIG. 8.
Figure 10:
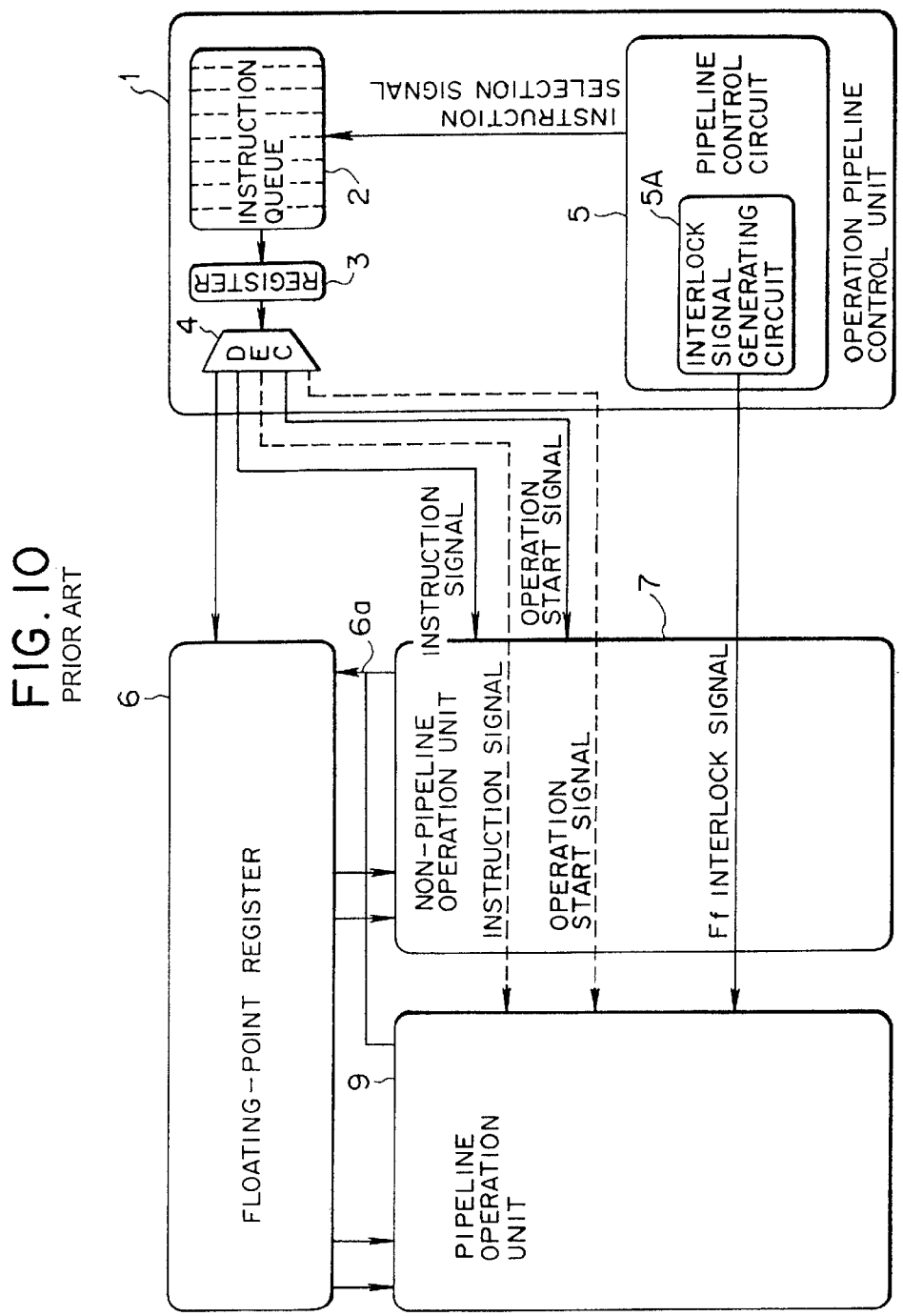
FIG. 10 is a block diagram showing a pipeline operation device which includes a pipeline operation unit and a non-pipeline operation unit sharing one writing port, according to another embodiment.

As a result, as shown in FIGS. 4 and 5, the execution timing in the writing stage Wf of the operation result from the divider 27 is shifted by one stage from that in the writing stage Wf of the operation result from the multiplier 29. Each operation result can be written sequentially to the FR 26.

Next, the operation of the entire pipeline operation device of the present embodiment which includes the pipeline control circuit 25 and the operation end previous notice signal generating circuit 28 will be described with reference to FIG. 4. FIG. 4 shows the time chart for the operation of the pipeline operation device, where n is the number of operation stages of the divider 27 and m (<n) is the number of operation stages of the multiplier 29.

In the first instruction selection stage Sf, the instruction to be executed next is selected among plural operation instructions stored in the instruction queue 22, according to an instruction selection signal sent from the pipeline control circuit 25, and then is stored into the instruction register 23.

In the next register reading stage Ff, the decoder 24 in the operation pipeline control unit 21 translates the instruction stored in the instruction register 23, and then issues the register signal to the FR 26, based on the translated result, thus reading address data needed for an arithmetic operation out of the FR 26 to the divider 27 or the multiplier 29. At the same time, the arithmetic operation (operation execution stage) starts by issuing the instruction signal and the operation start signal to the divider 27 or the multiplier 29.

Where the instruction selected by the instruction queue 22 is a division instruction, the decoder 24 translates or decodes the division instruction in the register reading stage Ff, thus reading address data needed for an arithmetic operation out of the FR 26 to the divider 27, based on the decode result. At the same time, the decoder 24 outputs an instruction signal and an operation start signal to the divider 27 to start a dividing operation. Thereafter, the pipeline operation circuit 25 selects a multiplication instruction from the instruction queue 22, the operation process of the multiplier 29 is performed as a pipeline operation, together with the operation process of the divider 27.

As shown in FIG. 4, where the instruction register 23 selects and stores an operation instruction to the multiplier 29 sharing the writing port 26a among instructions stored in the instruction queue 22 in the ((n−(m+1))-th operation stage E[n−(m+1)]f of the divider 27, in response to an instruction selection signal issued from the pipeline control circuit 25, if the operation instruction to the multiplier 29 is processed without any change, the writing stage Wf of the divider 27 overlaps with the writing stage Wf of the multiplier 29.

Figure 3B:
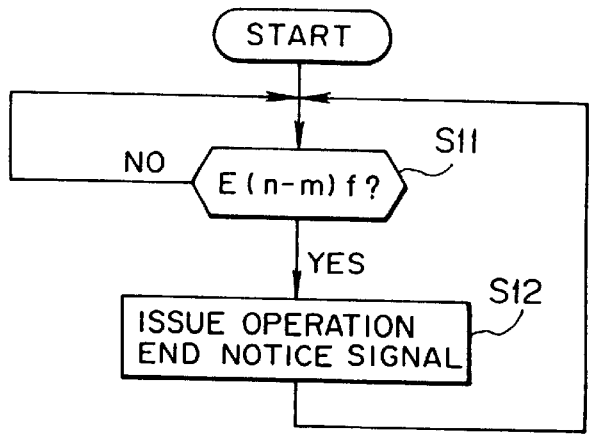
FIG. 3(b) is a flow chart used for explaining the operation end notice signal producing circuit according to the present embodiment.

In the present embodiment, as described in FIG. 3(b), just before the (m+1)-th stage in which the divider 27 completes an arithmetic operation, or in the (n−m)-th operation stage E(n−m)f of the divider 27, the operation end previous notice signal generating circuit 28 in the divider 27 issues an operation end previous notice signal to the operation pipeline control unit 21 (pipeline control circuit 25).

In the pipeline control circuit 25 which has received the operation end previous notice signal, as described in FIG. 3(a), the interlock signal generating circuit 30 issues the Ff interlock signal to the decoder 24 for the period 1τ (one stage), but does not translate the selected instruction.

As a result, an operation signal and an operation start signal are not issued to the multiplier 29. The multiplier 29, as shown in FIG. 4, is interlocked for the period 1τ (one stage) in the register reading stage Ff. Hence the operations in the operation stages E1f to Emf following the register reading stage Ef are delayed by 1τ.

Hence, the writing stage Wf of the operation result from the multiplier 29 is executed with a delay of one stage from the writing stage Wf of the operation result from the divider 27. Since the writing stages Wf do not overlap to each other, each operation result can be written sequentially into the FR 26.

FIG. 5 shows the operation of the entire pipeline operation device according to the present embodiment including the pipeline control circuit 25 and the operation end previous notice signal generating circuit 28. The numerals are set in more concrete as the number of operation stages. The basic operation is the same as that described with FIG. 4. FIG. 5 shows the operation in the case where the number n of operation stages of the divider 27 is 38 and the number of operation stages m of the multiplier 29 is 5.

In the concrete example shown in FIG. 5, where an operation instruction to the multiplier 29 is selected among instructions stored in the instruction queue 22 in the 32[=n−(m+1)]-th operation stage E32f of the divider 27, and then stored in the instruction register 23, if the operation instruction to the multiplier 29 is executed without any change, the writing stage Wf of the divider 27 overlaps with the writing stage Wf of the multiplier 29.

As described above, just before the 6(=m+1)-th stage in which the divider 27 completes the operation, or in the 33 (=n−m)-th operation stage E33f of the divider 27, the operation end previous notice signal generating circuit 28 in the divider 27 issues an operation end previous notice signal to the pipeline control circuit 25 and the interlock signal generating circuit 30 issues the Ff interlock signal to the decoder 24 for the period 1τ (one stage). Hence the decoder does not translate the selected instruction.

As a result, the operation signal and the operation start signal are not issued to the multiplier 29. Since the multiplier 29, as shown in FIG. 5, is interlocked for the period 1τ (one stage) in the register reading stage Ff, the operations in the operation stages E1f to E5f following the register reading stage Ff are delayed by the period 1τ. The writing stage Wf of the operation result from the multiplier 29 executes with a delay of one stage from the writing stage Wf of the operation result from the divider 27 so that the writing stages Wf do not overlap each other. Each operation result can be written sequentially to the FR 26.

According to the embodiment of the present invention, where the writing stage Wf of the operation result from the multiplier 29 overlaps with the writing stage Wf of the operation result from the divider 27, the execution in the register reading stage (instruction decoding stage) Ff is interlocked only for the period 1τ.

The writing stage Wf of the operation result from the divider 27 is shifted from the writing stage Wf of the operation result from the multiplier 29 in the execution timing. Hence each operation result is written to the FR 26, without conventionally stopping the operation of the multiplier 29 being a pipeline operation device in the writing stage Wf. Hence, a very simplified circuit (the operation end notice signal generating circuit 28) added to the divider 27 can effectively write the operation result of plural operation units 27 and 29 sharing the writing port 26a into the FR 26. Hence the operation performance can be largely improved.

In the above embodiment, it has been described that the pipeline operation device is a multiplier and the non-pipeline operation device is a divider. However, the present invention should not be limited only to the above embodiment. The pipeline operation device may be an adder or a subtracter. The non-pipeline operation device may be any type of operation units where the pipeline operation is impossible.

What is claimed is:

1. A pipeline operation method suitable to a system including a pipeline operation unit that can perform a pipeline operation, a non-pipeline operation unit that cannot perform a pipeline operation, and a register that is shared by said pipeline operation unit and said non-pipeline operation unit, said pipeline operation method comprising the steps of:

performing an arithmetic operation while an operation result of each of said pipeline and non-pipeline operation units is being written into said register; and interlocking, when a writing stage of the operation result from said pipeline operation unit overlaps with a writing stage of the operation result from said non-pipeline operation unit, translation of an instruction to said pipeline operation unit prior to the writing stages of the operation results of said pipeline and non-pipeline operation units.

2. The pipeline operation method according to claim 1, further comprising the steps of:

producing, before an end of the arithmetic operation of said non-pipeline operation unit, an operation end previous notice signal that notices and reports the end of the arithmetic operation of said non-pipeline operation unit; and interlocking translating an instruction to said pipeline operation unit by one stage, according to said operation end previous notice signal.

3. The pipeline operation method according to claim 2, further comprising the step of:

producing said operation end previous notice signal when an (n−m)-th operation stage of said non-pipeline operation unit is performed, where m is the number of operation stages of said pipeline operation unit and n (>m) is the number of operation stages of said non-pipeline operation unit.

4. A pipeline operation device comprising:

a pipeline operation unit to perform a pipeline operation;

a non-pipeline operation unit that cannot perform a pipeline operation;

a register shared by said pipeline operation unit and said non-pipeline operation unit; and an operation pipeline control unit to control the operation of each of said pipeline operation unit and said non-pipeline operation unit;

wherein said operation pipeline control unit performs an arithmetic operation while an operation result of each of said pipeline and non-pipeline operation units is being written into said register, and said operation pipeline control unit includes an interlock execution unit to interlock translating, when a writing stage of the operation result from said pipeline operation unit overlaps with a writing stage of the operation result from said non-pipeline operation unit, an instruction to said pipeline operation unit prior to the writing stages of the operation results of said pipeline and non-pipeline operation units.

5. The pipeline operation device according to claim 4, wherein said non-pipeline operation unit includes an operation end previous notice signal generating circuit to generate, before an end of the arithmetic operation of said non-pipeline unit, an operation end notice signal to said operation pipeline control unit, said operation end notice signal noticing and reporting the end of the arithmetic operation of said non-pipeline operation unit, wherein said interlock execution unit interlocks translating instruction to said pipeline operation unit by one stage, according to said operation end previous notice signal from said operation end notice signal generating circuit.

6. The pipeline operation device according to claim 5, wherein said operation end previous notice signal generating circuit generates said operation end previous notice signal when an (n−m)-th operation stage of said non-pipeline operation unit is performed, where m is the number of operation stages of said pipeline operation unit and n (>m) is the number of operation stages of said non-pipeline operation unit.

* * * * *